United States Patent
Honda

(10) Patent No.: US 7,502,900 B2
(45) Date of Patent: Mar. 10, 2009

(54) DATA PROCESSING INTEGRATED CIRCUIT INCLUDING A MEMORY TRANSFER CONTROLLER

(75) Inventor: Iwao Honda, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 409 days.

(21) Appl. No.: 11/315,593

(22) Filed: Dec. 23, 2005

(65) Prior Publication Data

US 2007/0296620 A1    Dec. 27, 2007

(30) Foreign Application Priority Data

Jan. 6, 2005    (JP)    ............... 2005-001296

(51) Int. Cl.
G06F 12/02    (2006.01)
G06F 12/00    (2006.01)
G06F 13/00    (2006.01)

(52) U.S. Cl. ................. 711/154; 711/202; 710/104
(58) Field of Classification Search ............... None
See application file for complete search history.

(56) References Cited

U.S. PATENT DOCUMENTS 5,828,786 A * 10/1998 Rao et al. .......... 382/236

| 7,020,749 B2 | 3/2006 | Azuma ............ 711/137 |
| 2002/0054229 A1* | 5/2002 | Sasaki ............ 348/312 |
| 2004/0181655 A1* | 9/2004 | Azuma ............ 712/241 |

FOREIGN PATENT DOCUMENTS

| JP | 10-63574 | 3/1998 |
| JP | 2004-272851 | 9/2004 |

* cited by examiner

Primary Examiner—Reginald G Bragdon
Assistant Examiner—Eric Loonan
(74) Attorney, Agent, or Firm—Fish & Richardson P.C.

(57) ABSTRACT

A data processing integrated circuit comprises a CPU, a memory that stores a program for controlling the CPU, a memory transfer controller for sending/receiving data to/from an external memory provided external to the data processing integrated circuit, and a read address storing section into which an address of data in the external memory is set by the CPU controlled by the program stored in the memory, which data is to be used at a later stage than a process being executed by the CPU, wherein the memory transfer controller transfers the data stored at the address in the external memory to the memory.

16 Claims, 8 Drawing Sheets

DATA PROCESSING INTEGRATED CIRCUIT INCLUDING A MEMORY TRANSFER CONTROLLER

CROSS-REFERENCE TO RELATED APPLICATIONS

The present application claims priority from Japanese Patent Application No. 2005-1296 filed on Jan. 6, 2005, which is herein incorporated by reference.

BACKGROUND OF THE INVENTION

1. Field of the Invention

The present invention relates to an integrated circuit that transfers programs or data used by CPU from external memory to internal memory and particularly decodes encoded sound data.

2. Description of the Related Art

DVD players decode encoded video data and sound data to play back video and sound. FIG. 8 illustrates a sound decoder 100 mounted on these DVD players, which decodes encoded sound data. The sound decoder 100 comprises a DSP (Digital Signal Processor) 101 and embedded memory 102 such as an SRAM and a ROM. The DSP 101 decodes encoded sound data using a program and data stored in the embedded memory 102.

As an encoding method for sound data for DVDs, various standards such as Dolby Digital, DTS, and Linear PCM are available. Programs and data for all these standards may be stored in the embedded memory 102 of the sound decoder 100. In this case, as the number of encoding methods to deal with increases, the necessary capacity of the embedded memory 102 of the sound decoder 100 increases.

Usually, inside an integrated circuit such as the sound decoder 100, a cache memory of small capacity is provided, and outside the integrated circuit, a memory of large capacity is provided. In the process by the integrated circuit, if necessary data exists in the cache memory, the data can be obtained faster compared with obtaining from the external memory. Furthermore, where the cache memory is used, so-called pre-fetch is performed in which to predict programs and data that will become necessary in the integrated circuit in the future and to load the programs and data from the external memory into the cache memory in advance (refer to Japanese Patent Application Laid-Open Publication No. H10-63574).

As described above, a program and data for each encoding method for sound data need to be stored in the embedded memory 102 of the sound decoder 100. Hence, as the capacity of the embedded memory 102 increases, the chip area of the sound decoder 100 becomes larger thus increasing costs.

Moreover, it is possible to store programs and data necessary for encoding sound data in the external memory of the sound decoder 100 and provide a cache memory in the sound decoder 100. However, where the cache memory is used, a cache miss may occur even if pre-fetch with prediction is performed. If a cache miss occurs, the DSP 101 needs to obtain a program and data from the external memory thus reducing the processing speed of decoding. The sound decoder 100 has encoded sound data continuously input thereto. Hence, if processing speed is reduced due to a cache miss, smooth playback cannot be performed.

SUMMARY OF THE INVENTION

The present invention was made in view of the above problem. An object thereof is to reduce the chip area of a sound decoder, an integrated circuit, used in a DVD player or the like without reducing processing speed.

To achieve the above and other objects, a data processing integrated circuit according to one aspect of the present invention comprises a CPU, a memory that stores a program for controlling the CPU, a memory transfer controller for sending/receiving data to/from an external memory provided external to the data processing integrated circuit, and a read address storing section into which an address of data in the external memory is set by the CPU controlled by the program stored in the memory, which data is to be used at a later stage than a process being executed by the CPU. The memory transfer controller transfers the data stored at the address in the external memory to the memory.

In the data processing integrated circuit, a plurality of the memories may be provided, and the read address storing sections may be provided one for each of the memories, wherein the CPU sets the address of the data to be used by the CPU into the read address storing section corresponding to one of the memories which do not store data used by the CPU, into which the data is to be stored, under the control of the program stored in the memories, and wherein the memory transfer controller transfers the data stored at the address in the external memory to the memory corresponding to the read address storing section.

The data processing integrated circuit may further comprise a write address storing section into which a destination address in the external memory for data stored in the memory is set by the CPU controlled by the program stored in the memory. The memory transfer controller transfers the data stored in the memory to the destination address in the external memory.

In addition, in the data processing integrated circuit, a plurality of the memories may be provided, and the write address storing sections may be provided one for each of the memories, wherein the CPU sets the destination address into the write address storing section corresponding to one, storing the data to be written into the external memory, of the memories under the control of a program stored in the memories, and wherein the memory transfer controller transfers the data stored in the memory corresponding to the write address storing section to the destination address in the external memory.

Moreover, in the data processing integrated circuit, the memory has one data input/output port, and the memory transfer controller may switch an operation clock of the memory to being an operation clock for the external memory in order to access the memory, and after the access finishes, switch the operation clock of the memory to being an operation clock for the CPU.

The data processing integrated circuit may further comprise a storing section that stores read instruction data which indicates an instruction to read initial data, wherein the memory transfer controller transfers the initial data stored in the external memory at a predetermined address to the memory according to the read instruction data.

The data processing integrated circuit may further comprise a sound data receiver that receives encoded sound data, wherein the data that the memory transfer controller transfers from the external memory to the memory is data needed in a process of decoding the encoded sound data.

The data processing integrated circuit may further comprise a digital signal processing circuit that receives an RF signal containing sound data, converts the RF signal into a digital signal, and outputs, wherein the sound data receiver receives encoded sound data contained in the digital signal.

Accordingly, the chip area of a sound decoder, an integrated circuit, used in a DVD player or the like can be reduced without reducing processing speed.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

==Entire Configuration==

Figure 1:
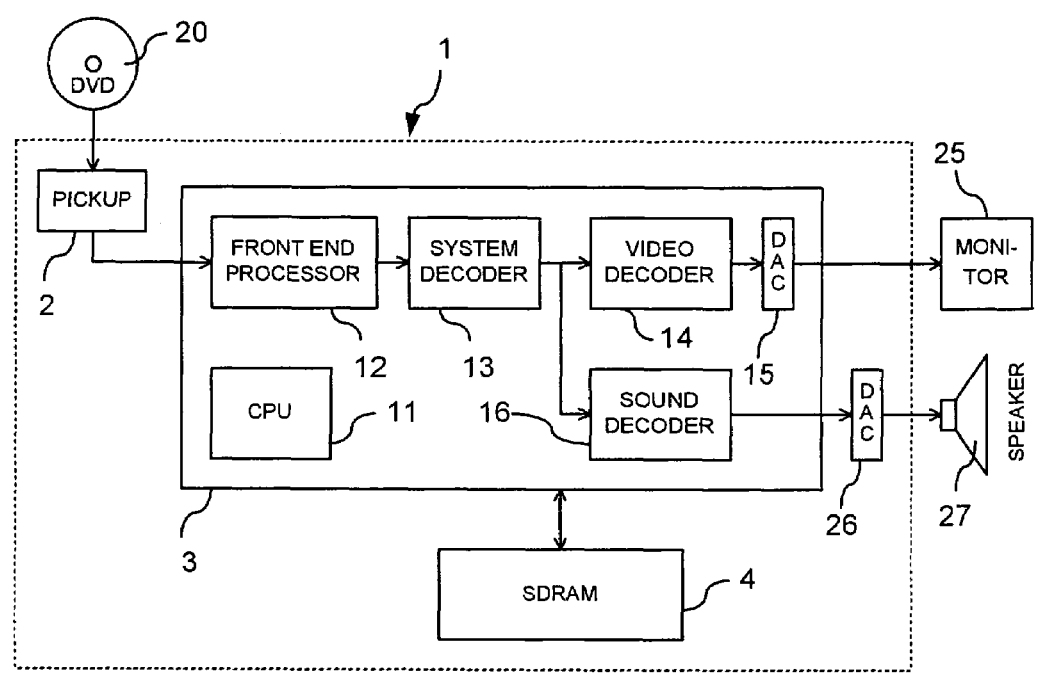
FIG. 1 illustrates the configuration of a DVD player according to an implementation of the present invention.

FIG. 1 is a diagram illustrating the configuration of a DVD player 1 according to an implementation of the present invention. The DVD player 1 comprises a pickup 2, a DVD playback circuit 3, and an SDRAM (external memory) 4. The DVD playback circuit 3 is a chip that includes a CPU 11 controlling the whole, a front end processor (digital signal processing circuit) 12, a system decoder 13, a video decoder 14, a DAC (DA Converter) 15, and a sound decoder (data processing integrated circuit) 16. The SDRAM 4 stores programs, data, and the like used by the DVD playback circuit 3.

The pickup 2 irradiates light onto the surface of a DVD 20 to read out a signal from the DVD 20 and outputs an RF signal (waveform signal). The front end processor 12 receives the RF signal output from the pickup 2 and converts the RF signal into digital data having values 0 or 1. The digital data output from the front end processor 12 contains encoded video data and encoded sound data that have been given respective identifiers. The system decoder 13 receives the digital data output from the front end processor 12, separates the video data and the sound data on the basis of the identifiers, and inputs the encoded video data to the video decoder 14 and the encoded sound data to the sound decoder 16.

The video decoder 14 receives the encoded video data, performs a decoding process according to the MPEG (Moving Picture Experts Group) standard or the like, and outputs a decoded video signal. The video signal output from the video decoder 14 is then output to a monitor 25 through the DAC 15. The sound decoder 16 receives the encoded sound data, performs a decoding process corresponding to the encoding method, and outputs a decoded sound signal. The sound decoder 16 can decode sound data of plural encoding formats such as Dolby Digital, DTS, and Linear PCM. The sound signal output from the sound decoder 16 is then output to a speaker 27 through the DAC 26.

==Outline of the Configuration of the Sound Decoder==

Figure 2:
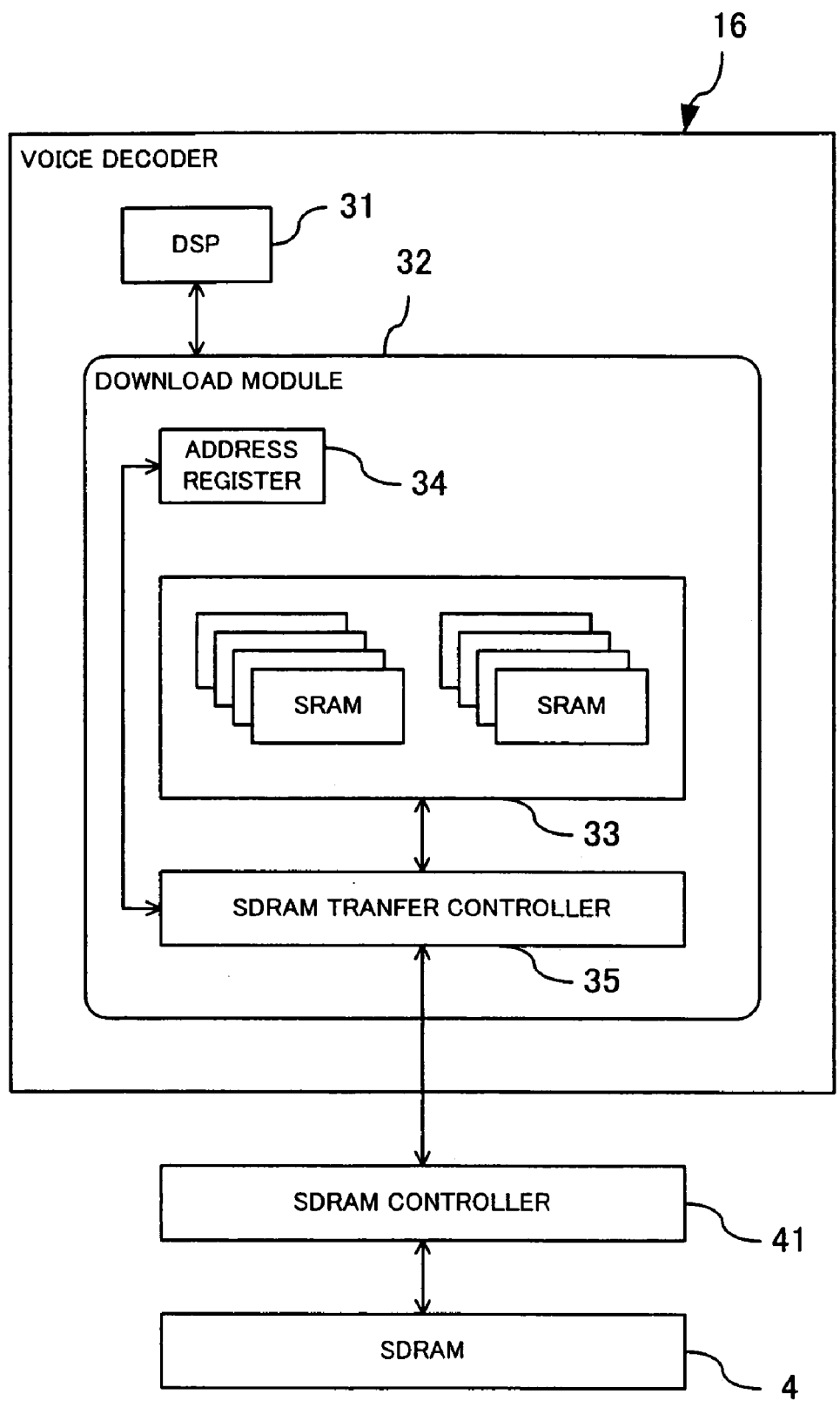
FIG. 2 shows an outline of the configuration of a sound decoder, an implementation of a data processing integrated circuit according to the invention.

FIG. 2 is a diagram showing an outline of the configuration of the sound decoder 16, an implementation of a data processing integrated circuit according to the invention. The sound decoder 16 comprises a DSP (CPU) 31 and a download module 32. The download module 32 comprises plural SRAMs (memory) 33, an address register (read address and write address storing sections) 34, and an SDRAM transfer controller (memory transfer controller) 35.

Figure 3:
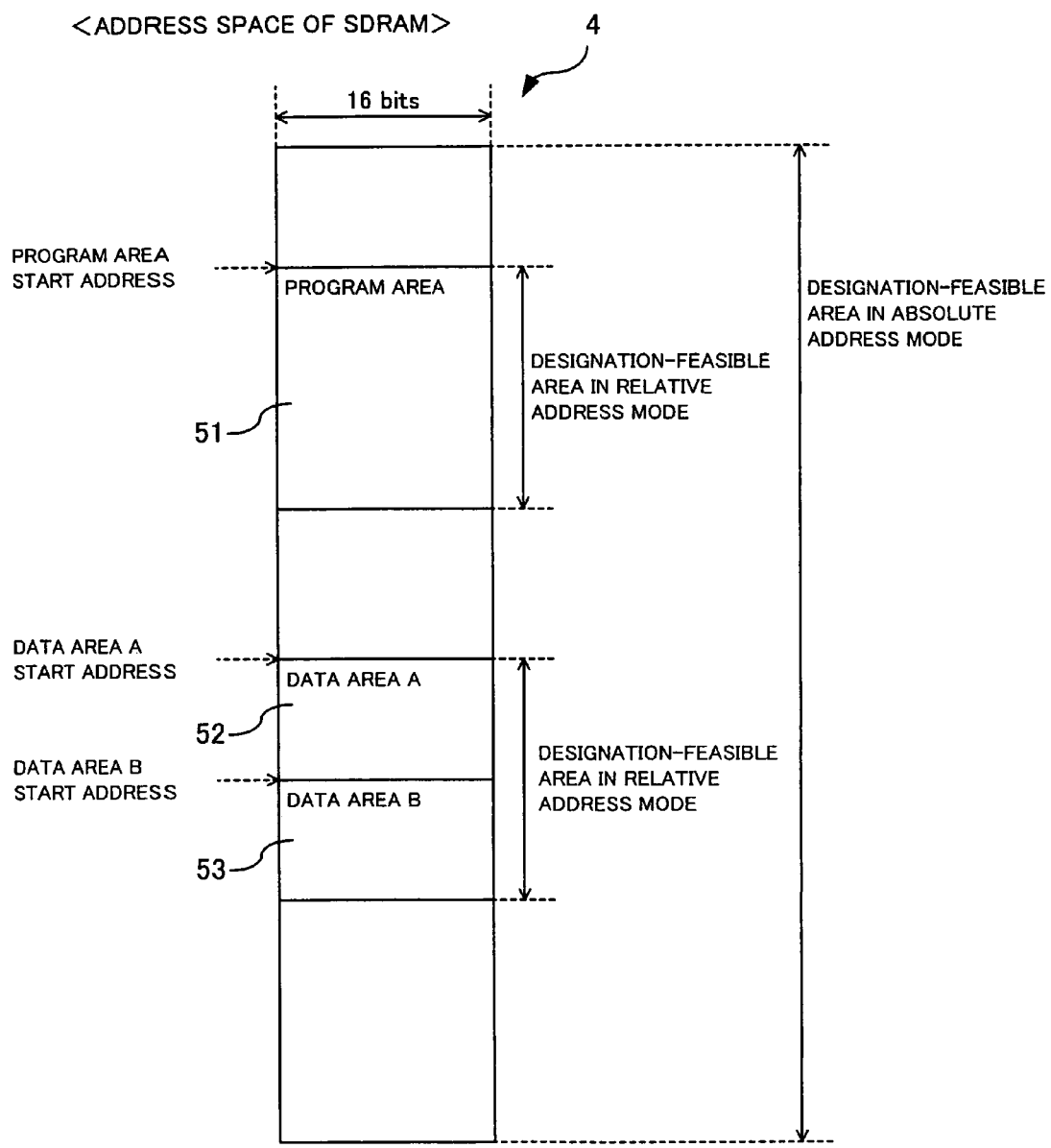
FIG. 3 shows the address space of an SDRAM.

The DSP 31 performs a decoding process on the encoded sound data by executing a program stored in the SRAMs 33. The program and data necessary for the decoding process are stored in the SDRAM 4 external to the sound decoder 16. FIG. 3 shows the address space of the SDRAM 4. The SDRAM 4 has a program area 51 storing programs used in decoding, and a data area A, 52, and a data area B, 53, storing data such as tables used in decoding. A resident program (initial data) is stored in an area of 2 k words at the start of the program area 51. Resident data (initial data) is stored in an area of 512 words at the start of the data area A, 52. Areas other than these are used to store data of results of decoding and for data sending/receiving between modules of the DVD playback circuit 3.

When reading out a program or data in the SDRAM 4, the DSP 31 sets the address register 34 to the address in the SDRAM 4 of the program or data. Then, the SDRAM transfer controller 35 sends an SDRAM controller 41 an instruction to read the program or data stored at the address, which stores the program or data sent from the SDRAM 4 into the SRAM 33 in response to the instruction. Thereafter, the DSP 31 can read out the program or data from the SRAM 33. When writing data into the SDRAM 4, the DSP 31 sets the address register 34 to the address to write into, and writes write data into the SRAM 33. Thereafter, when the DSP 31 instructs the SDRAM transfer controller 35 to transfer, the SDRAM transfer controller 35 sends an SDRAM controller 41 an instruction to write the data stored in the SRAM 33 into the address. Note that such addresses can be relative addresses to the start address of the area 51 to 53 shown in FIG. 3 or absolute addresses in the SDRAM 4.

That is, the download module 32 can transfer (download) a program or data stored in the SDRAM 4 to the SRAM 33 according to an instruction from the DSP 31. The DSP 31 instructs the download module 32 to download in advance a program or data to be needed at the later stage than the decoding process being executed and thus can read out the program or data from the SRAM 33 when using it. Also, the download module 32 can transfer (upload) data from the SRAM 33 to the SDRAM 4 according to an instruction from the DSP 31.

==Detailed Configuration and Operation of the Sound Decoder==

Next, the detailed configuration and operation of the sound decoder will be described.

(1) Program Read

Figure 4:
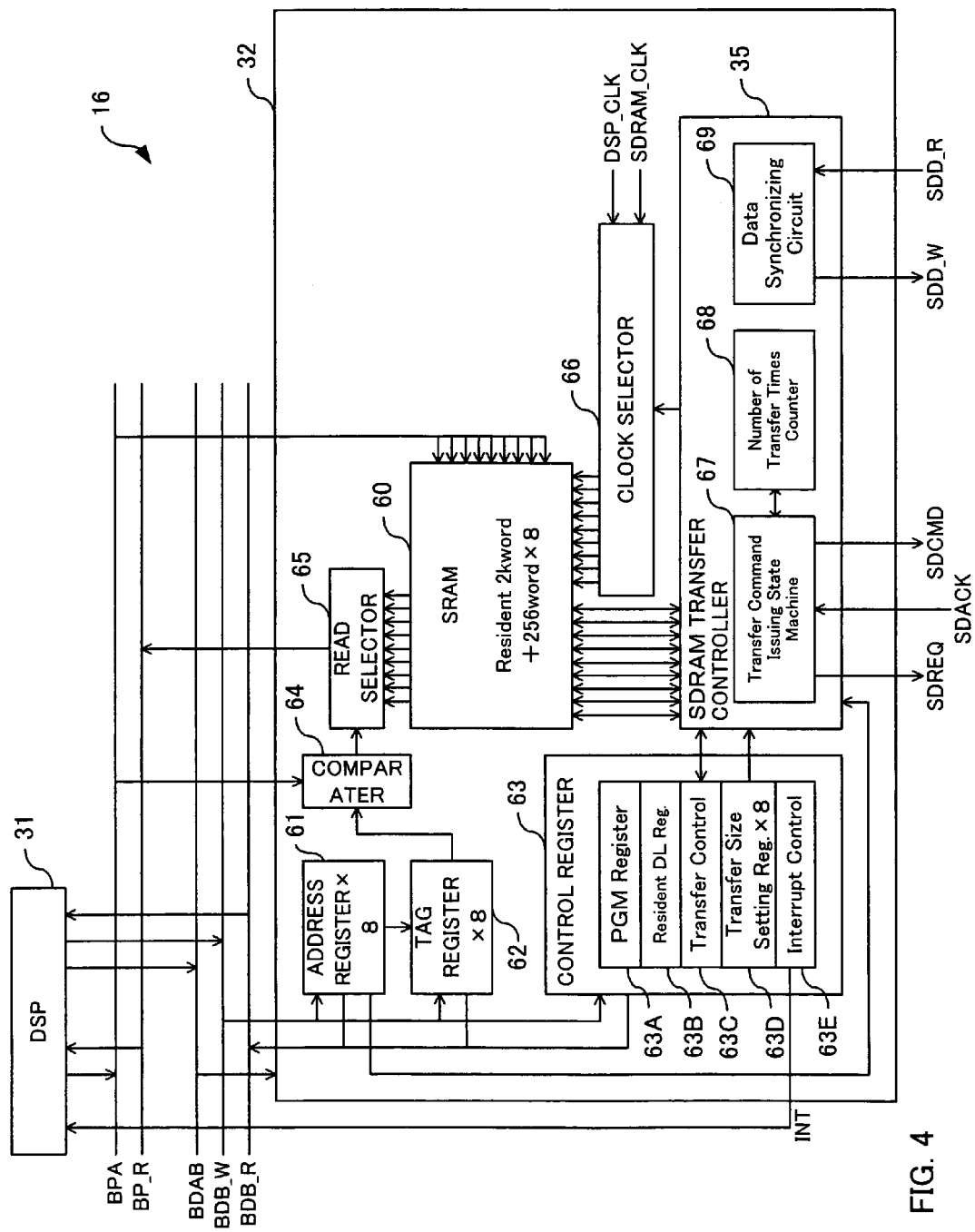
FIG. 4 illustrates the configuration of the circuits involved in reading programs of the sound decoder.

FIG. 4 is a diagram illustrating the configuration of the circuits involved in reading programs of the sound decoder 16. As shown in FIG. 4, the sound decoder 16 comprises a DSP 31, an SRAM 60, address registers 61, tag registers 62, a control register 63, a comparator 64, a read selector 65, a clock selector 66, and the SDRAM transfer controller 35.

As buses connecting the DSP 31 and peripheral circuits, a program address bus (BPA), a program read bus (BP_R), a data address bus (BDAB), a data write bus (BDB_W), and a data read bus (BDB_R). Here, the address in the SDRAM 4 of a program to be read is output to the program address bus (BPA), and a program read out from the SRAM 60 is output to the program read bus (BP_R). Furthermore, the address of the register 61-63 is output to the data address bus (BDAB); data to be written into the register 61-63 is output to the data write bus (BDB_W); and data read from the register 61-63 is output to the data read bus (BDB_R).

The SRAM 60 is included in the plural SRAMs 33 and comprises an area of, e.g., 2 k words storing a resident program (initial program) (a resident program area), the word being 24-bits wide, and eight areas of, e.g., 256 words storing other programs (program areas). Each of the areas of the SRAM 60 is a memory having an address port and a data input/output port, and data can be input to/output from each area independently. Note that the DSP 31 and the SDRAM transfer controller 35 share the address port and data input/output port of each area.

The address registers 61 and the tag registers 62 are included in the address register 34 and provided respectively for the program areas of the SRAM 60 and are set to the address in the SDRAM 4 of a program to be read or the like. The control register 63 includes a program area start address register (PGM register) 63A, a resident area download instruction register (resident DL register) 63B, a transfer control register 63C, transfer size setting registers 63D, and an interrupt control register 63E.

The program area start address register 63A has the start address of the program area 51 of the SDRAM 4 set therein. The resident area download instruction register 63B is set to, e.g., one (read instruction data) to download a resident program from the SDRAM 4. The transfer control register 63C has, for example, bits corresponding respectively to the eight program areas of the SRAM 60, and a transfer process is performed for the program area corresponding to one of the bits set at one. The transfer size setting registers 63D are provided respectively for the program areas of the SRAM 60, and are set to the transfer size of a program to be downloaded from the SDRAM 4. The interrupt control register 63E has, for example, bits corresponding respectively to the eight program areas of the SRAM 60, and one of the bits corresponding to a program area for which a transfer process is complete is set to one. When any bit of the interrupt control register 63E is set to one, an interrupt signal is sent to the DSP 31.

The SDRAM transfer controller 35 comprises a transfer command issuing state machine 67, a number of transfer times counter 68, and a data synchronizing circuit 69. On the basis of the setting in the transfer control register 63C, the transfer command issuing state machine 67, for example, sends a transfer request (SDREQ) to the SDRAM 4, receives a reply signal (SDACK) to transfer request, and sends a transfer command (SDCMD). The number of transfer times counter 68 controls the number of times when the transfer command is issued by the transfer command issuing state machine 67 based on the setting in one of the transfer size setting registers 63D. The data synchronizing circuit 69 receives data (SDD_R) from the SDRAM 4 or sends data (SDD_W) to the SDRAM 4.

An operation clock (DSP_CLK) for the DSP 31 and an operation clock (SDRAM_CLK) for the SDRAM 4 are input to the clock selector 66, which inputs one of the operation clocks to the areas of the SRAM 60 under the control of the transfer command issuing state machine 67. To transfer a program from the SDRAM 4 to an area of the SRAM 60, the operation clock of the area is switched to being the operation clock for the SDRAM 4, and after the transfer finishes, it is switched to being the operation clock for the DSP 31.

The comparator 64 compares the addresses set in the eight tag registers 62 and the high-order address (e.g., eight high-order bits) of the address output to the program address bus (BPA), and outputs to the read selector 65 a signal indicating a tag register 62 that matches. Furthermore, the low-order address (e.g., eight low-order bits) of the program address bus (BPA) is input to the address port of each area of the SRAM 60. The program stored at the low-order address of each area is output to the read selector 65. The read selector 65 selects the program output from the area of the SRAM 60 corresponding to the tag register 62 indicated by the signal output from the comparator 64 and outputs it to the program read bus (BP_R). Note that if the program stored in the resident program area is read, the high-order address of the program address bus (BPA) does not match the high-order address in any tag register 62. Thus, if the comparator 64 outputs a signal indicating that there is no tag register 62 that matches, the read selector 65 selects the program output from the resident program area and outputs it to the program read bus (BP_R).

The process flow of the DSP 31 reading a program stored in the SDRAM 4 will be described. First, the CPU 11 external to the sound decoder 16 sets the resident area download instruction register 63B to one. Thus, the SDRAM transfer controller 35 transfers 2 k words at the start address of the program area 51, set in the program area start address register 63A, to the resident program area of the SRAM 60.

Thereafter, the DSP 31 executes the program stored in the SRAM 60, and a program stored in the SDRAM 4 is downloaded to a program area of the SRAM 60.

Figure 5:
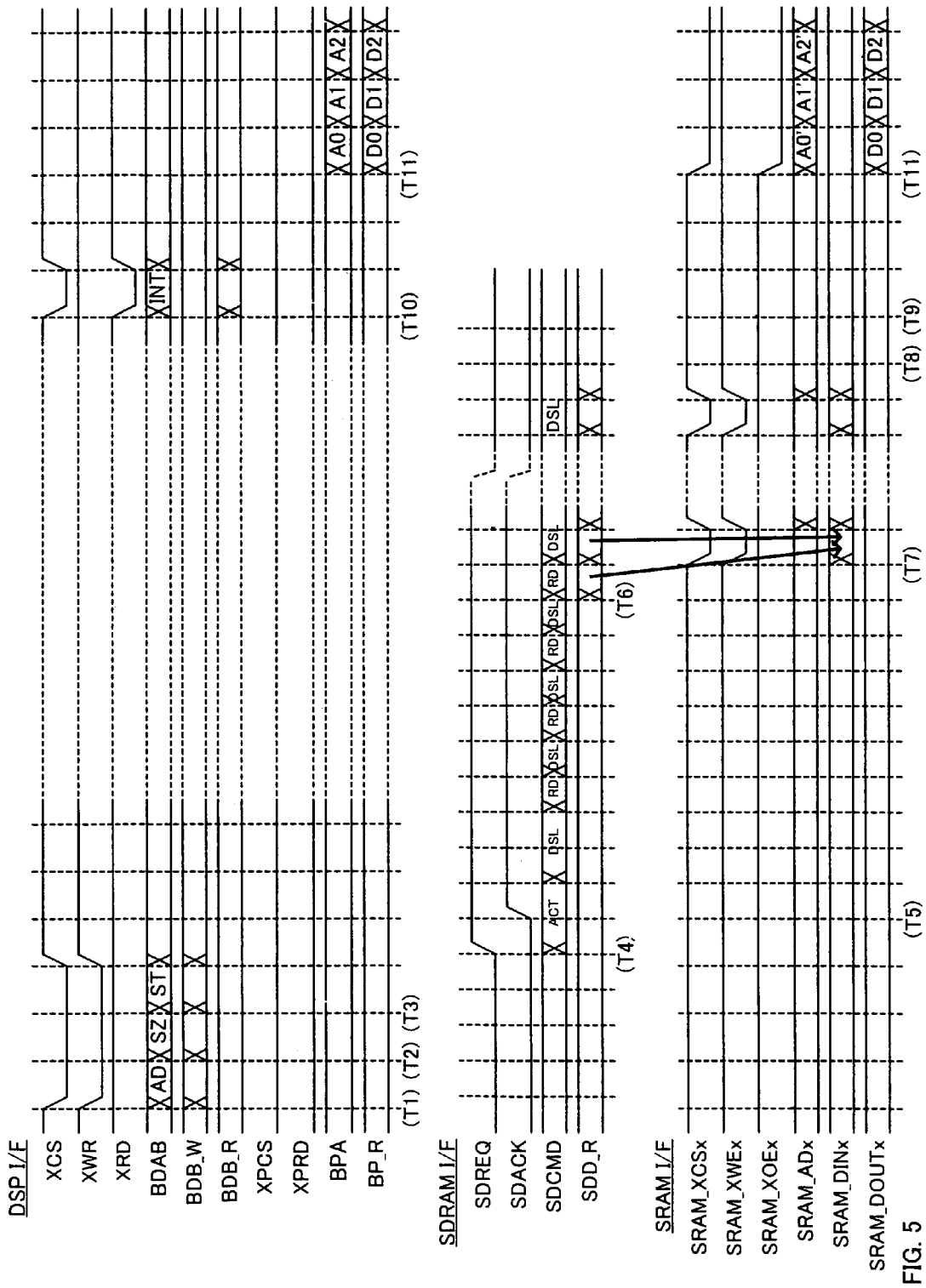
FIG. 5 is timing charts when downloading a program.

FIG. 5 illustrates timing charts when downloading a program. "DSP I/F" illustrates input/output signals for the DSP 31. XCS is a signal output when the DSP accesses the control register 63, and when at an L level, the DSP can access the control register 63. XWR is a signal to indicate a write into the control register 63, and when at the L level, the DSP can write data in. XRD is a signal to indicate a read from the control register 63, and when at the L level, the DSP can read data. XPCS is a signal output when the DSP accesses the SRAM 60, and when at an L level, the DSP can access the SRAM 60. XPRD is a signal to indicate a read from the SRAM 60, and when at the L level, data can be read. In this implementation, XPCS and XPRD are always at the L level. BDAB, BDB_W, BDB_R, BPA, and BP_R are the buses mentioned above.

"SDRAM I/F" illustrates input/output signals for the SDRAM 4. SDREQ indicates a transfer request to the SDRAM 4 and is at an H level while a transfer request is being output. SDACK is a reply signal from the SDRAM 4 and at the H level while a reply is being output. SDCMD is a signal indicating a transfer command for the SDRAM 4.

"SRAM I/F" illustrates input/output signals for an area (X) of the SRAM 60. SRAM_XCSx is a signal selecting the area (X), and when at the L level, the area (X) can be operated on. SRAM_XWEx is a write control signal for the area (X), and when at the L level, data can be written into the area (X). SRAM_XOEx is a read control signal for the area (X), and when at the L level, data can be read from the area (X). SRAM_ADx is a signal input to the address port of the area (X), and the low-order address of the program address bus (BPA) is input to the port. SRAM_DINx is a signal input to the data input port of the area (X), and SRAM_DOUTx is a signal output from the data output port of the area (X).

Following the timing charts, the flow of downloading a program will be described. First, at time T1, the DSP 31 outputs a signal of the L level to XCS and XWR, and the address of the address registers 61 corresponding to an area (X) of the SRAM 60 to store a program to the data address bus (BDAB), and outputs a relative address from the start address of the area 51 of the SDRAM 4 of the program to be downloaded to the data write bus (BDB_W). By this means, the address register 61 is set to the relative address. Then, at time T2, the DSP 31 outputs the address of a transfer size setting register 63D corresponding to the area (X) to the data address bus (BDAB) and the transfer size of the program to be downloaded to the data write bus (BDB_W). By this means, the transfer size setting register 63D is set to the transfer size. Then, at time T3, the DSP 31 outputs the address of the transfer control register 63C to the data address bus (BDAB) and data having its bit corresponding to the area (X) set to one to the data write bus (BDB_W). By this means, a bit corresponding to the area (X) of the transfer control register 63C is set to one.

After the bit corresponding to the area (X) of the transfer control register 63C is set to one, from time T4, the transfer command issuing state machine 67 of the SDRAM transfer controller 35 outputs a transfer request (SDREQ) to the SDRAM 4 and outputs a transfer command (SDCMD) to read from the location indicated by the relative address set in the address register 61 corresponding to the area (X). The transfer command (SDCMD) is repeatedly issued under the control of the number of transfer times counter 68 based on the transfer size set in the transfer size setting register 63D.

At time T5, the SDRAM transfer controller 35 switches the operation clock of the area (X) to being the operation clock for the SDRAM 4 via the clock selector 66. Then, from time T6, the data synchronizing circuit 69 receives the program (SDD_R) from the SDRAM 4. Then, from time T7, the data synchronizing circuit 69 inputs a signal of the L level to SRAM_XCSx and SRAM_XWEx, a destination address to SRAM_ADx, and the program (SDD R) received from the SDRAM 4 to SRAM_DINx. By this means, the program received from the SDRAM 4 is stored into the area (X) of the SRAM 60. In this implementation, one word (24-bits wide) of the SRAM 60 is corresponding to, e.g., two words (16-bits×2 wide) of the SDRAM 4. The data synchronizing circuit 69 discards the eight high-order bits of two words from the SDRAM 4 to produce one word (24-bits wide) to be stored into the SRAM 60.

At time T8, when the program has been transferred from the SDRAM 4 to the area (X) of the SRAM 60, the SDRAM transfer controller 35 sets the bit corresponding to the area (X) of the transfer control register 63C to zero, which indicates the completion of transfer, and the relative address set in the address register 61 corresponding to the area (X) is set into a corresponding tag register 62. Moreover, the SDRAM transfer controller 35 sets the bit corresponding to the area (X) of the interrupt control register 63E to one. By this means, an interrupt signal is sent to the DSP 31. At time T9, the SDRAM transfer controller 35 switches the operation clock of the area (X) to being the operation clock for the DSP 31 via the clock selector 66.

After receiving the interrupt signal, at time T10 the DSP 31 outputs a signal of the L level to XRD and the address of the interrupt control register 63E to the data address bus (BDAB). By this means, the interrupt control register 63E outputs its data to the data read bus (BDB_R). After confirming the completion of transfer to the area (X) from the data of the interrupt control register 63E, at time T11, the DSP 31 outputs the address of the program to be read to the program address bus (BPA). Also, the DSP 31 inputs the L level to SRAM_XCSx and SRAM_XOEx for the area (X), and the low-order address of the address output to the program address bus (BPA) is input to the address port (SRAM_ADx) of the area (X) of the SRAM 60. By this means, the program stored at the low-order address in the area (X) is output to the data output port (SRAM_DOUTx).

Note that the low-order address is input to the address ports of the other areas than the area (X) and a program stored at the low-order address in each area is output to its data output port, then being input to the read selector 65. And the read selector 65 selects the program output from the data output port (SRAM_DOUTx) of the area (X) on the basis of the output of the comparator 64 and outputs it to the program read bus (BP_R).

(2) Data Read/Write

Figure 6:
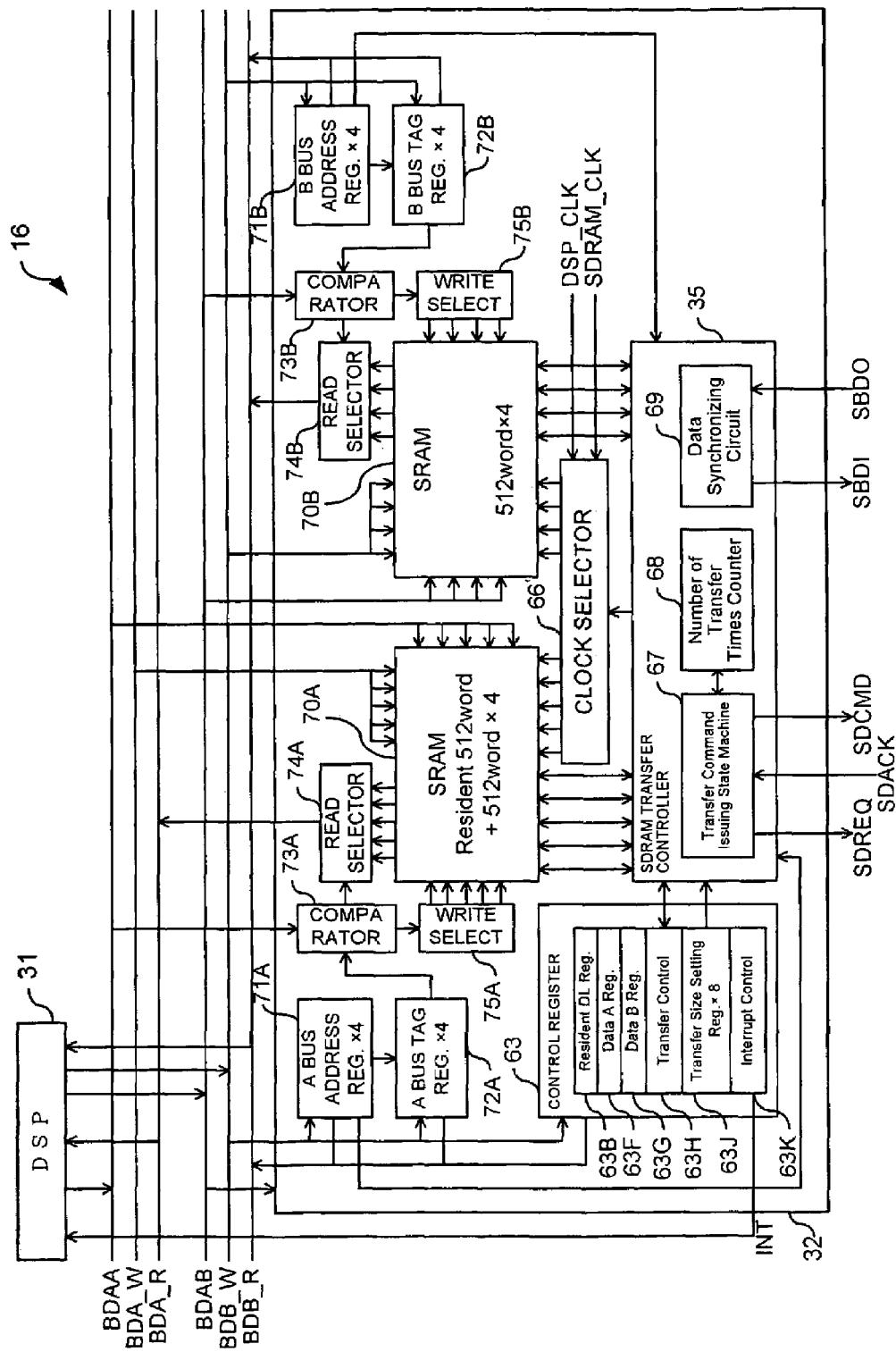
FIG. 6 illustrates the configuration of the circuits involved in reading and writing data of the sound decoder.

FIG. 6 is a diagram illustrating the configuration of the circuits involved in reading and writing data of the sound decoder 16. As shown in Figure, the sound decoder 16 comprises the DSP 31, SRAMs 70A, 70B, address registers 71A, address registers 71B, tag registers 72A, tag registers 72B, the control register 63, comparators 73A, 73B, read selectors 74A, 74B, write selectors 75A, 75B, the clock selector 66, and the SDRAM transfer controller 35.

As buses connecting the DSP 31 and peripheral circuits, data address buses (BDAA, BDAB), data write buses (BDA_W, BDB_W), and data read buses (BDA_R, BDB_R). Here, the address in the SDRAM 4 of data to be read/written is output to the data address bus (BDAA); data to be written into the SRAM 70A is output to the data write bus (BDA_W); and data read from the SRAM 70A is output to the data read bus (BDA_R). Likewise, the address in the SDRAM 4 of data to be read/written is output to the data address bus (BDAB); data to be written into the SRAM 70B is output to the data write bus (BDB_W); and data read from the SRAM 70B is output to the data read bus (BDB_R). Moreover, the address of the register 71A, 71B, 72A, 72B, or 63 is output to the data address bus (BDAB); data to be written into the register 71A, 71B, 72A, 72B, or 63 is output to the data write bus (BDB_W); and data read from the register 71A, 71B, 72A, 72B, or 63 is output to the data read bus (BDB_R).

The SRAMs 70A, 70B are included in the plural SRAMs 33; the SRAM 70A is used in transferring data from/to the data area A, 52, of the SDRAM 4, and the SRAM 70B is used in transferring data from/to the data area B, 53, of the SDRAM 4.

The SRAM 70A comprises an area of, e.g., 512 words storing a resident data (a resident data area) and four areas of, e.g., 512 words storing data (data areas). The SRAM 70B comprises four areas of, e.g., 512 words (data areas). Each of the areas of the SRAMs 70A, 70B is a memory having an address port and a data input/output port, and data can be input to/output from each area independently. Note that the DSP 31 and the SDRAM transfer controller 35 share the address port and data input/output port of each area.

The address registers 71A, 71B and the tag registers 72A, 72B are included in the address register 34 and provided respectively for the data areas of the SRAMs 70A, 70B, and are set to the address in the SDRAM 4 of data to be read/written and the like. The control register 63 includes the resident area download register (resident DL register) 63B, a data area A start address register (data A register) 63F, a data area B start address register (data B register) 63G, a transfer control register 63H, transfer size setting registers 63J, and an interrupt control register 63K.

The data area A start address register 63F is set to the start address of the data area A, 52, of the SDRAM 4 and the data area B start address register 63G is set to the start address of the data area B, 53, of the SDRAM 4. The transfer control register 63H has bits to instruct to download respectively into the eight data areas of the SRAMs 70A, 70B and bits to instruct to upload from them. For example, when the bit to instruct to download for a data area is set to one, transfer (download) from the SDRAM 4 to the data area corresponding to the bit is performed. For example, when the bit to instruct to upload for a data area is set to one, transfer (upload) from the data area corresponding to the bit to the SDRAM 4 is performed.

Moreover, the transfer size setting registers 63J are provided respectively for the data areas of the SRAMs 70A, 70B and set to the transfer size of data download/upload between the SDRAM 4 and them. The interrupt control register 63K has bits to indicate the completion of download and bits to indicate the completion of upload respectively for the eight data areas of the SRAMs 70A, 70B. For example, when download into a data area finishes, the bit to indicate the completion of download for the data area is set to one. For example, when upload from a data area finishes, the bit to indicate the completion of upload for the data area is set to one. Furthermore, if any bit of the interrupt control register 63K is set to one, an interrupt signal is sent to the DSP 31.

The process flow of downloading data into the SRAMs 70A, 70B is the same as in the above case of a program. That is, in order to download data stored in the data area A, 52, of the SDRAM into a data area of the SRAM 70A, the DSP 31 sets an address register 71A corresponding to the destination data area to a relative address from the start address of the data area A, 52 and a corresponding transfer size setting register 63J to the transfer size. Then, when the DSP 31 sets the bit to instruct to download for the data area to one, the SDRAM transfer controller 35 transfers the data from the SDRAM 4 to the data area of the SRAM 70A according to the set address and transfer size. Also, the data downloaded into the SRAM 70A is read out like in the case of a program.

The flow of the DSP 31 writing data into the SDRAM 4 will be described. In order to write data into the data area A, 52, of the SDRAM 4, an address register 71A and a tag register 72A are set to the relative address to be written into. Then, the DSP 31 outputs the address to the data address bus (BDAA) and data to be written to the data write bus (BDA_W). The low-order address (e.g., nine low-order bits) of the address output to the address bus (BDAA) is input to the address port of each area of the SRAM 70A, and the data output to the data write bus (BDA_W) is input to the data input/output port of each area. The comparator 73A has inputted thereto the high-order address (e.g., seven high-order bits) of the address output to the address bus (BDAA) and the addresses set in the four tag registers 72A. The comparator 73A compares the high-order address and the seven high-order bits of the addresses set in the four tag registers 72A, and outputs to the write selector 75A a signal indicating a tag register 72A that matches. Then, the write selector 75A outputs a signal to write the data inputted to the data input/output port to the area corresponding to a tag register 72A indicated by the signal from the comparator 73A. In this way, data is written into an area of the SRAM 70A.

Note that if data is written into the resident data area, the high-order address of the address bus (BDAA) does not match the high-order address in any tag register 72A. Thus, if the comparator 73A outputs a signal indicating that there is no tag register 72A that matches, the write selector 75A outputs a signal to write the data inputted to the data input/output port to the resident data area.

Subsequently, to transfer the data written in the area of the SRAM 70A to the SDRAM 4, the DSP 31 sets a corresponding transfer size setting register 63J to the transfer size and sets the bit of the transfer control register to instruct to upload for the area to one. Then, the SDRAM transfer controller 35 transfers the data stored in the area of the SRAM 70A to the SDRAM 4 according to the settings in the address register 71A and the transfer size setting register 63J. After the transfer finishes, the SDRAM transfer controller 35 sets the bit of the transfer control register 63H to instruct to upload for the area to zero, which indicates the completion of transfer, and the bit of the interrupt control register 63K to indicate the completion of upload for the area to one.

Note that when starting transfer from the SRAM 70A to the SDRAM 4, the SDRAM transfer controller 35 switches the operation clock of the SRAM 70A to being the operation clock for the SDRAM 4 via the clock selector 66 and after the transfer finishes, switches the operation clock of the SRAM 70A to being the operation clock for the DSP 31 via the clock selector 66.

In the above description, an example of reading/writing data at a relative address in the SDRAM 4 has been described, but reading/writing data at an absolute address is also possible.

In the case of designating an absolute address to read data in the SDRAM 4, the DSP 31 sets the address register 71A to the absolute address. The SDRAM transfer controller 35 transfers data from the SDRAM 4 to the SRAM 70A, designated by the absolute address set in the address register 71A. Because the DSP 31 cannot access the areas of the SRAM 70A at an absolute address, the absolute address is converted into a relative address in the data area A, 52, and the relative address is set in the tag register 72A. The DSP 31 outputs the relative address to the address bus (BDAA), and thereby can read data downloaded at the absolute address in the SRAM 70A.

In the case of designating an absolute address to write data into the SDRAM 4, in a similar way to the above, data is written into the SRAM 70A at a relative address. Thereafter, in order to write the data from the SRAM 70A into the SDRAM 4 at the absolute address, the absolute address is written into the address register 71A. Then, the SDRAM transfer controller 35 transfers the data to the SDRAM 4 at the absolute address set in the address register 71A.

==Reading Beforehand in the Sound Decoder==

Figure 7:
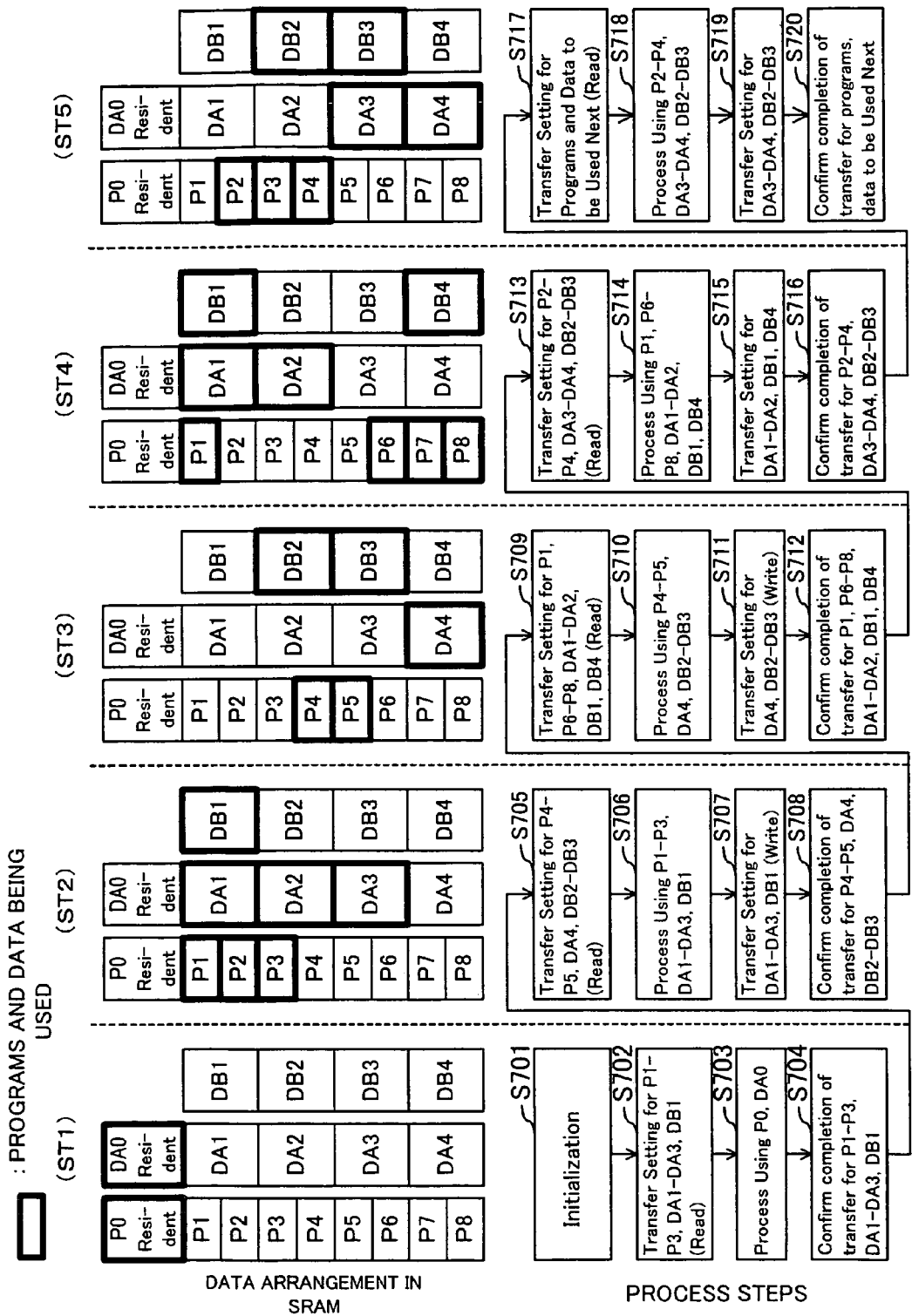
FIG. 7 is a flow chart showing an example of a reading-beforehand process.
Figure 8:
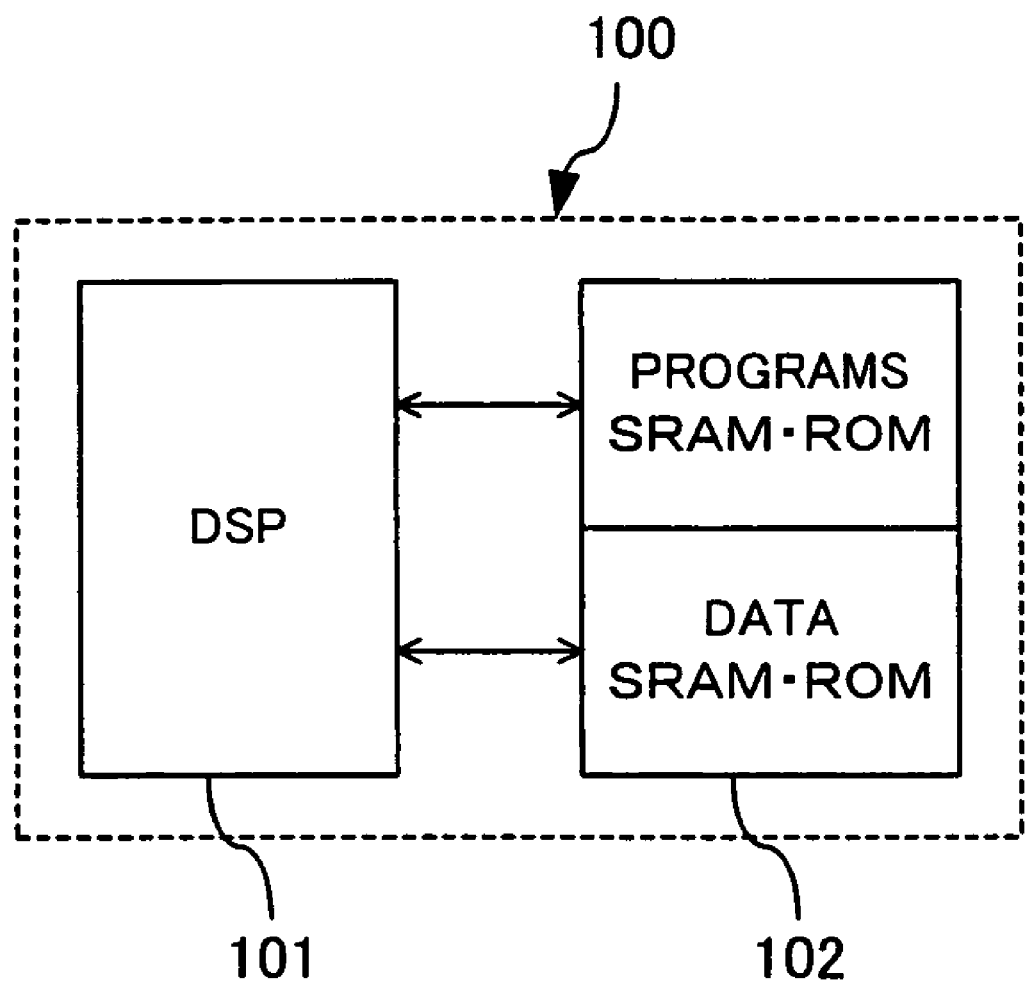
FIG. 8 illustrates the configuration of a conventional sound decoder.

Next, a reading-beforehand process by the sound decoder 16 will be described where a program and data necessary to decode encoded sound data are read from the SDRAM 4 before becoming necessary. FIG. 7 is a flow chart showing an example of the reading-beforehand process. Here, P0 denotes the resident program area of the SRAM 60, and P1-P8 denote the eight program areas of the SRAM 60. Furthermore, DA0 denotes the resident data area of the SRAM 70A, DA1-DA4 the four data areas of the SRAM 70A, and DB1-DB4 the four data areas of the SRAM 70B.

First, a first state (ST1) is a state where a resident program is loaded in P0 and resident data is loaded in DA0. The areas enclosed by thick frames are where programs or data used by the DSP 31 are stored. In this state, first, the DSP 31 performs various initializing processes (S701). Then, the DSP 31 sets the address registers 61, 71A, 71B and the like (hereinafter called transfer setting) so as to transfer programs and data necessary at the later stage to P1-P3, DA1-DA3, and DB1, under the control of program (S702). Then, the DSP 31 performs a decoding process using P0 and DA0 (S703). Meanwhile, according to the above procedure, the SDRAM transfer controller 35 transfers the programs and data to P1-P3, DA1-DA3, and DB1 based on the transfer settings. When the DSP 31 confirms the completion of transfer to P1-P3, DA1-

DA3, and DB1 via an interrupt signal or the like (S704), the sound decoder 16 switches to the next state (ST2).

In the next state (ST2), first, the DSP 31 performs transfer setting for transferring programs and data necessary at the later stage to P4-P5, DA4, and DB2-DB3, under the control of program (S705). Then, while the SDRAM transfer controller 35 performs the transfer based on the transfer settings, the DSP 31 performs a decoding process using the downloaded P1-P3, DA1-DA3, and DB1 (S706). Then, the DSP 31 performs transfer setting for transferring the data updated in the process S706 from DA1-DA3 and DB1 to the SDRAM 4 (S707). When the DSP 31 confirms the completion of transfer to P4-P5, DA4, and DB2-DB3 via an interrupt signal or the like (S708), the sound decoder 16 switches to the next state (ST3).

In the next state (ST3), first, the DSP 31 performs transfer setting for transferring programs and data necessary at the later stage to P1, P6-P8, DA1-DA2, DB1 and DB4, under the control of program (S709). Then, the DSP 31 performs a decoding process using the downloaded P4-P5, DA4, and DB2-DB3 (S710). Next, the DSP 31 performs transfer setting for transferring the data updated in the process S710 to the SDRAM 4 (S711). When the DSP 31 confirms the completion of transfer to P1, P6-P8, DA1-DA2, DB1 and DB4 via an interrupt signal or the like (S712), the sound decoder 16 switches to the next state (ST4).

In the next state (ST4), first, the DSP 31 performs transfer setting for transferring programs and data necessary at the later stage to P2-P4, DA3-DA4, and DB2-DB3, under the control of program (S713). Then, the DSP 31 performs a decoding process using the downloaded P1, P6-P8, DA1-DA2, DB1 and DB4 (S714). Next, the DSP 31 performs transfer setting for transferring the data updated in the process S714 to the SDRAM 4 (S715). When the DSP 31 confirms the completion of transfer to P2-P4, DA3-DA4, and DB2-DB3 via an interrupt signal or the like (S716), the sound decoder 16 switches to the next state (ST5).

In the next state (ST5), first, the DSP 31 performs transfer setting for transferring programs and data necessary at the later stage to the SRAMs 60, 70A, 70B, under the control of program (S717). Then, the DSP 31 performs a decoding process using the downloaded P2-P4, DA3-DA4, and DB2-DB3 (S718). Next, the DSP 31 performs transfer setting for transferring the data updated in the process S718 to the SDRAM 4 (S719). When the DSP 31 confirms the completion of transfer of the programs and data necessary at the later stage via an interrupt signal or the like (S720), the sound decoder 16 switches to the next state.

That is, the programs for the decoding processes include description of a process of performing transfer setting for programs and data necessary at the later stage, and while performing a decoding process, the DSP 31 performs transfer setting for programs and data necessary at the later stage than the decoding process. By this means, when the decoding process reaches the later stage, the DSP 31 obtains the programs and data necessary from the SRAMs 60, 70A, 70B.

The sound decoder 16 and DVD playback circuit 3 using it that is one implementation of the present invention has been described. As described above, programs and data needed by the sound decoder 16 in the decoding processes are stored in the SDRAM 4 external thereto. And the sound decoder 16 downloads programs and data according to an encoding format into the internal SRAM 33 under the control of program before they become needed in the decoding process and decodes sound data by use of the downloaded programs and data.

With this configuration, all programs and data used in the decoding processes need not be stored in the internal memory of the sound decoder 16. Hence, the capacity of the internal memory and thus the chip area of the sound decoder 16 can be reduced. Also, the sound decoder 16 downloads programs and data stored in the SDRAM 4 into the SRAM 33 under the control of program before they become needed. Hence, during the decoding process, a wait time does not occur due to downloading the programs and data from the SDRAM 4, and thus processing speed of the decoding process is not lowered. Moreover, even if programs and data are increased in number because of the addition of an encoding format to be dealt with or the like, while the capacity of the SDRAM 4, an external memory, is increased, the SRAM 33, the internal memory, of the sound decoder 16 need not be increased in capacity.

Although in the present implementation, all programs and data used in the decoding processes are stored in the SDRAM 4 that is an external memory, either the programs or the data may be stored in an SRAM, ROM, or the like provided in the sound decoder 16.

Furthermore, the data processing integrated circuit of the present invention can be applied to various processing circuits, not being limited to the sound decoder 16 of the implementation. Also in this case, by storing programs and data needed in that process in an SDRAM or the like external to the data processing integrated circuit and downloading the programs and data into an SRAM or the like inside the data processing integrated circuit under the control of program before they become needed in that process, the capacity of the internal memory and thus chip area can be reduced without reducing processing speed.

Moreover, in the sound decoder 16, the SRAM 33 has a plurality of areas provided, and while a program or data is being transferred from the SDRAM 4 to an area in which data used by the CPU is not stored, the DSP 31 can access a program or data stored in another area of the SRAM 33. Therefore, in processes consecutively executed like decoding processes for sound data, there is no intermittence and thus no reduction of processing speed.

Yet further, in the sound decoder 16, by writing data into the SRAM 33 and performing transfer setting such as the setting of the address registers, data can be written into the SDRAM 4. That is, even where data needs to be updated, programs and data can be stored in an external memory such as an SDRAM with the data processing integrated circuit of the present invention. Still further, in the sound decoder 16, the SRAM 33 has a plurality of areas provided, and while data is being transferred from an area to the SDRAM 4, the DSP 31 can continue a process using a program or data stored in another area of the SRAM 33. Therefore, in processes consecutively executed like decoding processes for sound data, there is no intermittence and thus no reduction of processing speed.

Moreover, in the sound decoder 16, a data input/output port is provided for each area of the SRAM 33, and by switching the operation clock of the SRAM 33, accesses from the DSP 31 and accesses from the SDRAM transfer controller 35 can be handled. While it is possible to provide two data input/output ports for each area of the SRAM 33 one for each of the DSP 31 and the SDRAM transfer controller 35, as seen from the implementation, by provide only one data input/output port for each area, the chip area of the sound decoder 16 can be reduced.

In the sound decoder 16, the resident program and resident data are stored in the SDRAM 4, and when the CPU 11 or the like external to the sound decoder 16 sets a bit of the register to instruct to download, the resident program and resident data are transferred to the SRAM 33. As such, the resident program and resident data can also be stored in the SDRAM 4. Thus, the capacity of the internal memory and chip area of the sound decoder 16 can be further reduced.

While in the implementation, the sound decoder 16 is the data processing integrated circuit of the present invention, the DVD playback circuit 3 can be the data processing integrated circuit of the present invention. Also in this case, by using the sound decoder 16 in the DVD playback circuit 3, the chip area of the DVD playback circuit 3 can be reduced without reducing processing speed of the decoding process for sound data.

Although the implementation of the present invention has been described, the above implementation is provided to facilitate the understanding of the present invention and not intended to limit the present invention. It should be understood that various changes and alterations can be made therein without departing from spirit and scope of the invention and that the present invention includes its equivalents.

What is claimed is:

1. A data processing integrated circuit comprising:
    a plurality of memories, each of the plurality of memories having an address port and a data input/output port;
    a memory transfer controller for sending/receiving data to/from an external memory provided external to the data processing integrated circuit;
    a plurality of read address storing sections that correspond respectively to the plurality of memories;
    a selector that selects data output from an address of the plurality of memories; and
    a digital signal processor (CPU) that sets an address of data in the external memory into one of the read address storing sections which corresponds to one of the plurality of memories that does not store data used by the CPU, the CPU executing a program stored in at least one of the plurality of memories, wherein:
    the memory transfer controller transfers the data stored at the address in the external memory to the one of the plurality of memories that does not store data used by the CPU, through the data input/output port of the one of the plurality of memories,
    the CPU outputs the address of data in the external memory, and outputs an address of data in the one of the plurality of memories to the address ports of the plurality of memories, in order to read the data, and
    the selector selects the data output from the one of the plurality of memories from a plurality of data output from the plurality of memories, based on the address of data in the external memory output from the CPU.

2. The data processing integrated circuit according to claim 1,
    wherein one of the read address storing sections is provided for each of the plurality of memories,
    wherein the CPU sets the address of the data to be used by the CPU into the read address storing section corresponding to the one of the plurality of memories that does not store data used by the CPU, into which the data is to be stored, under the control of the program stored in at least one of the plurality of memories, and
    wherein the memory transfer controller transfers the data stored at the address in the external memory to the one of the plurality of memories corresponding to the read address storing section.

3. The data processing integrated circuit according to claim 1, further comprising:
    a write address storing section into which a destination address in the external memory for data stored in one of the plurality of memories is set by the CPU controlled by the program stored in at least one of the plurality of memories,
    wherein the memory transfer controller transfers the data stored in one of the plurality of memories to the destination address in the external memory.

4. The data processing integrated circuit according to claim 3,
    wherein one write address storing section is provided for each of the plurality of memories,
    wherein the CPU sets the destination address into the write address storing section corresponding to one of the plurality of memories, storing the data to be written into the external memory, under the control of the program stored in at least one of the plurality of memories, and
    wherein the memory transfer controller transfers the data stored in the one of the plurality of memories corresponding to the write address storing section to the destination address in the external memory.

5. The data processing integrated circuit according to claim 4,
    wherein the number of the data input/output port of each of the memories is one, and
    wherein the memory transfer controller switches an operation clock of the plurality of memories to being an operation clock for the external memory in order to access the memory, and after the access finishes, switches the operation clock of the plurality of memories to being an operation clock for the CPU.

6. The data processing integrated circuit according to claim 4, further comprising:
    a sound data receiver that receives encoded sound data,
    wherein the data that the memory transfer controller transfers from the external memory to the one of the plurality of memories is data needed in a process of decoding the encoded sound data.

7. The data processing integrated circuit according to claim 6, further comprising:
    a digital signal processing circuit that receives an waveform signal containing sound data, converts the waveform signal into a digital signal, and outputs,
    wherein the sound data receiver receives encoded sound data contained in the digital signal.

8. The data processing integrated circuit according to claim 3,
    wherein the number of the data input/output port of each of the memories is one, and
    wherein the memory transfer controller switches an operation clock of the plurality of memories to being an operation clock for the external memory in order to access the memory, and after the access finishes, switches the operation clock of the plurality of memories to being an operation clock for the CPU.

9. The data processing integrated circuit according to claim 3, further comprising:
    a sound data receiver that receives encoded sound data,
    wherein the data that the memory transfer controller transfers from the external memory to the one of the plurality of memories is data needed in a process of decoding the encoded sound data.

10. The data processing integrated circuit according to claim 9, further comprising:
    a digital signal processing circuit that receives an waveform signal containing sound data, converts the waveform signal into a digital signal, and outputs,
    wherein the sound data receiver receives encoded sound data contained in the digital signal.

11. The data processing integrated circuit according to claim 1,
  wherein the number of the data input/output port of each of the plurality of memories is one, and
  wherein the memory transfer controller switches an operation clock of the plurality of memories to being an operation clock for the external memory in order to access the memory, and after the access finishes, switches the operation clock of the plurality of memories to being an operation clock for the CPU.

12. The data processing integrated circuit according to claim 11, further comprising:
  a sound data receiver that receives encoded sound data,
  wherein the data that the memory transfer controller transfers from the external memory to the one of the plurality of memories is data needed in a process of decoding the encoded sound data.

13. The data processing integrated circuit according to claim 12, further comprising:
  a digital signal processing circuit that receives an waveform signal containing sound data, converts the waveform signal into a digital signal, and outputs,
  wherein the sound data receiver receives encoded sound data contained in the digital signal.

14. The data processing integrated circuit according to claim 1, further comprising:
  a storing section that stores read instruction data which indicates an instruction to read initial data,
  wherein the memory transfer controller transfers the initial data stored in the external memory at a predetermined address to one of the plurality of memories according to the read instruction data.

15. The data processing integrated circuit according to claim 1, further comprising:
  a sound data receiver that receives encoded sound data,
  wherein the data that the memory transfer controller transfers from the external memory to the one of the plurality of memories is data needed in a process of decoding the encoded sound data.

16. The data processing integrated circuit according to claim 15, further comprising:
  a digital signal processing circuit that receives an waveform signal containing sound data, converts the waveform signal into a digital signal, and outputs,
  wherein the sound data receiver receives encoded sound data contained in the digital signal.

* * * * *